J. A. & D. L. YOUNG.
CUSHIONING MEANS FOR VEHICLES.
APPLICATION FILED JAN. 19, 1915.
1,149,882.
Patented Aug. 10, 1915.
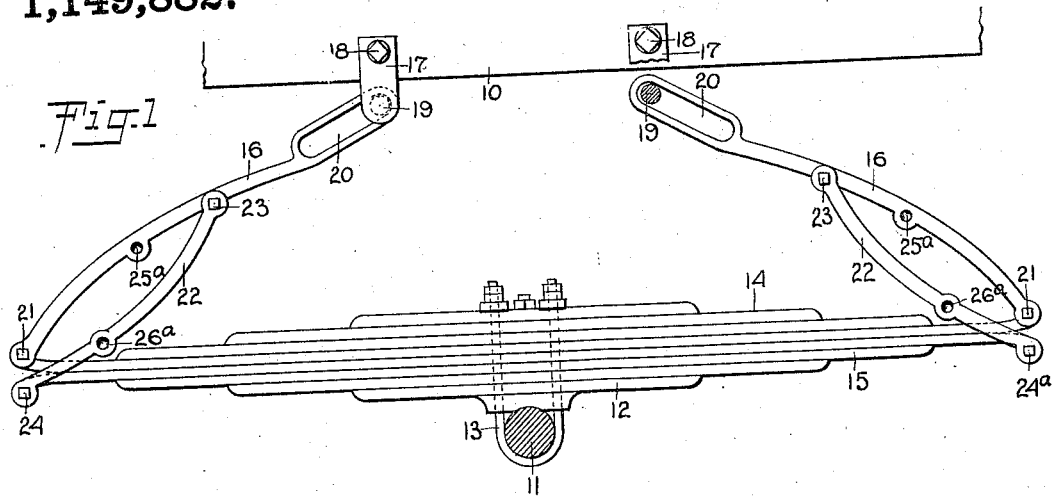
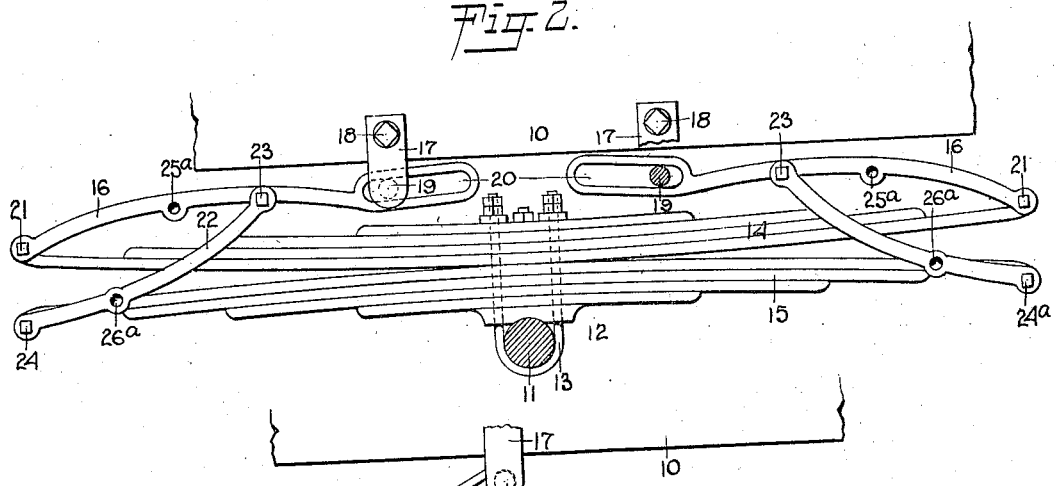
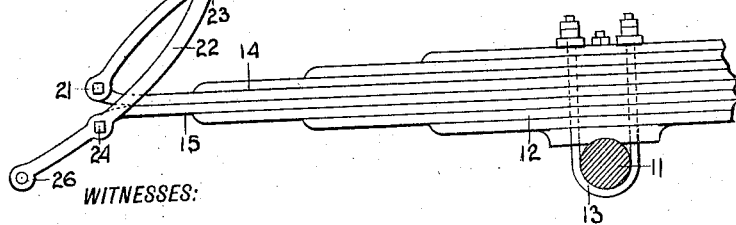
INVENTORS
Jacob A. Young
David L. Young
ATTORNEYS

UNITED STATES PATENT OFFICE.

JACOB A. YOUNG AND DAVID L. YOUNG, OF SANTA CRUZ, CALIFORNIA.

CUSHIONING MEANS FOR VEHICLES.

1,149,882.  Specification of Letters Patent.  Patented Aug. 10, 1915.

Application filed January 19, 1915. Serial No. 3,060.

*To all whom it may concern:*

Be it known that we, JACOB A. YOUNG and DAVID L. YOUNG, citizens of the United States, and residents of Santa Cruz, in the county of Santa Cruz and State of California, have invented a new and Improved Cushioning Means for Vehicles, of which the following is a full, clear, and exact description.

Our invention relates to vehicle springs and the means for connecting the same with a vehicle frame or chassis.

Objects of our invention are to provide a vehicle spring and attaching means whereby to minimize the possibility of breakage of the spring under rebound of the same; to provide a spring and its connections, whereby the spring will be brought into play automatically in proportion to the load or strain exerted thereon; to provide a lifting means for the spring, whereby the leverage between the spring and the frame or chassis may be altered as desired.

The invention will be particularly explained in the specific description following.

Reference is had to the accompanying drawings forming part of this specification, in which similar characters of reference indicate corresponding parts in all the views, and in which:

Figure 1 is a side elevation of a spring and its connecting means embodying our invention, showing the same applied to an axle and a portion of the vehicle frame; Fig. 2 is a view similar to Fig. 1, showing the relation of the parts when the spring is under tension; and Fig. 3 is a fragmentary view similar to Fig. 2 showing a different attachment of the connecting means between the spring and the frame.

Our improved device may be employed in connection with any suitable vehicle, a portion of the frame of which is conventionally shown, and designated by the numeral 10. On the axle 11 of the vehicle a spring designated generally by the numeral 12 is secured by any suitable means, such as a clip 13.

The spring 12 includes two spring elements that may be each made up of a series of leaves or laminations, said elements being designated respectively by the numerals 14 and 15. These elements are adapted to flex independently of each other, and in opposite directions relatively to a median line, said elements being placed back to back on the axle 11.

In connection with the upper spring element 14 levers 16 are employed, one at each end of the spring. Said levers are pivoted at their upper ends on the frame 10, or on an element appurtenant thereto, in a manner to have a rocking and sliding connection with the frame, so that the pivot point will be a shifting one. In the example shown hanger brackets 17 are secured to the frame by bolts 18, and pins 19 in said brackets extend through slots 20 in the levers 16. The opposite end of each lever 16 is pivotally connected as at 21 with the adjacent outer end of the upper spring element 14.

In connection with the levers 16 and the spring elements 14, 15, links 22 are employed, each link constituting at its upper end the fulcrum for the adjacent lever 16, at a point between the ends of the said lever. The connection between the upper end of the link 22 and the lever 16 may be a pin or bolt 23 passing through the upper end of the link and through the lever. The lower end of each link 22 is connected with the adjacent outer end of the lower spring element 15 by a bolt 24, or the like, so that the link will rock relatively to the said spring element.

With the described construction it will be seen, comparing Figs. 1 and 2, that upon a downward movement of the vehicle frame 10 under a load or jar, the levers 16 will be depressed at their upper ends; they will furthermore rock on the pivots 23 of the links 22 as fulcrums, and the outer ends of the levers will exert an upward pull on the ends of the upper leaf spring 14. Moreover, the resistance of the upper leaf spring as it is placed under tension will result in the load or shock being distributed through the links 22 to the lower leaf spring, the links being given a bodily downward movement as well as a rocking movement on their pivots 24, so that the lower leaf spring will be depressed at its ends and placed under tension. Furthermore, as the levers 16 continue to be depressed, the slot and pin connection 19, 20, of each lever will result in a shortening of the power arm of the levers as the distance decreases between the pins 19 and the fulcrums 23.

We provide means whereby the upper ends of the links 22 are connected with the levers 16 at different distances from the slots 20, whereby to vary the length of the power arm of each lever. For the desired purpose each lever 16 is formed with a plurality of bolt holes 25, 25ª, two being shown in each lever, the holes 25ª being farther from the slot 20 than the holes 25. In Figs. 1 and 2 the connection of the links with the levers is such as to give a shorter power arm, while in Fig. 3 which shows one of the levers, the latter is fulcrumed on its link 22 at that bolt hole farthest from the slot 20, whereby to increase the length of the power arm. In order to vary the effective length of the links 22 in accordance with the position of the fulcrums of the levers, said links are formed with a plurality of bolt holes at their lower ends to receive the bolts 24 connecting the links with the lower spring. The said bolt holes in the links 22 at the lower end are indicated by the characters 26, 26ª. Thus as seen from Fig. 3, the effective length of the link 22 is shortened by engaging the bolt 24 in the upper bolt hole.

Having thus described our invention, what we claim as new and desire to secure by Letters Patent, is:

1. The combination with a vehicle frame and a vehicle axle, of upper and lower leaf springs on the axle placed back to back, to flex in opposite directions from a horizontal median line, levers pivotally connected at their upper ends with the vehicle frame by rocking and sliding connections, and pivotally connected at their lower ends with the respective outer ends of the upper spring, and links on the upper ends of which the said levers are fulcrumed, between the ends of the levers, the lower ends of the links having means pivotally connecting the same with the lower springs at the outer ends of the latter, the said levers having means to effect a connection with the links at different distances from the upper ends of the levers, and the said links having variable means to effect the pivotal connection with the lower springs to vary the effective length of the links.

2. In a device of the character described, a pair of levers, means to slidably and rockably connect one end of each lever to a frame, spring elements adapted to be flexed in opposite directions to place the same under tension, means to connect the opposite end of each lever to one spring element, links each constituting at the upper end thereof a fulcrum for the adjacent lever between the ends of the latter, means to vary the point of connection between each lever and the said fulcrumed end of its link, and means to connect the said links at different points near their opposite ends with the second spring element, independently of the levers and their spring connecting means.

3. In a device of the character described, upper and lower leaf springs, placed back to back, to flex in opposite directions, a lever pivotally connected at its lower end with the outer end of the upper spring and having means at its upper end to effect a sliding means at its upper end to effect a slidable and rockable connection with a vehicle body, a link, means serving to fulcrum the lever on the upper end of the link between the ends of the lever, and means effecting a pivotal connection between the opposite end of the link and the lower spring.

4. In a device of the character described, upper and lower leaf springs placed back to back to flex in opposite directions, two levers pivotally connected at their lower ends with the upper spring and formed with longitudinal slots at their upper ends adapted to receive pivotal elements to connect said slotted ends with a vehicle frame, the said levers having a plurality of bolt holes between the ends thereof, links having a plurality of bolt holes near their lower ends and each having a bolt hole at its upper end, bolts serving to connect the upper ends of the links with the levers at either of the bolt holes of the latter, and bolts serving to connect the lower spring with the links at either one of the plurality of bolt holes formed at the lower ends of the links.

5. The combination with a vehicle body, and a part of the running gear of the vehicle, of two springs, a lever connected at one end with the vehicle body and at its opposite end with one of said springs, and a link connected at one end with the second spring and connected at its opposite end with the said lever between the ends of the said lever.

In testimony whereof we have signed our names to this specification in the presence of two subscribing witnesses.

JACOB A. YOUNG.
DAVID L. YOUNG.

Witnesses:
DAVID L. WILSON,
CLAY E. PETERS.

Copies of this patent may be obtained for five cents each, by addressing the "Commissioner of Patents Washington, D. C."